United States Patent
Ostlund et al.

US010836939B2

(10) Patent No.: US 10,836,939 B2
(45) Date of Patent: Nov. 17, 2020

(54) ONE-PART POLYURETHANE ADHESIVE COMPOSITION, METHOD OF MAKING A LAMINATE, AND LAMINATE

(71) Applicant: H.B. Fuller Company, St. Paul, MN (US)

(72) Inventors: Anthony J. Ostlund, Forest Lake, MN (US); Dorian P. Nelson, St. Paul, MN (US); Wayne G. Eklund, Scandia, MN (US); Marlen A. Valverde, Stillwater, MN (US)

(73) Assignee: H.B. Fuller Company, St. Paul, MN (US)

( * ) Notice: Subject to any disclaimer, the term of this patent is extended or adjusted under 35 U.S.C. 154(b) by 449 days.

(21) Appl. No.: 15/410,510

(22) Filed: Jan. 19, 2017

(65) Prior Publication Data

US 2017/0204310 A1    Jul. 20, 2017

Related U.S. Application Data

(60) Provisional application No. 62/280,447, filed on Jan. 19, 2016.

(51) Int. Cl.
*B32B 27/08* (2006.01)
*B32B 27/32* (2006.01)
(Continued)

(52) U.S. Cl.
CPC ............ *C09J 175/04* (2013.01); *B32B 5/022* (2013.01); *B32B 5/024* (2013.01); *B32B 5/18* (2013.01); *B32B 5/245* (2013.01); *B32B 5/26* (2013.01); *B32B 5/32* (2013.01); *B32B 7/12* (2013.01); *B32B 15/043* (2013.01); *B32B 15/046* (2013.01); *B32B 15/08* (2013.01); *B32B 15/082* (2013.01); *B32B 15/085* (2013.01); *B32B 15/088* (2013.01); *B32B 15/09* (2013.01); *B32B 15/12* (2013.01); *B32B 15/14* (2013.01); *B32B 15/20* (2013.01); *B32B 23/04* (2013.01); *B32B 23/042* (2013.01); *B32B 23/048* (2013.01); *B32B 23/06* (2013.01); *B32B 23/08* (2013.01); *B32B 23/10* (2013.01); *B32B 27/06* (2013.01); *B32B 27/065* (2013.01); *B32B 27/08* (2013.01); *B32B 27/10* (2013.01); *B32B 27/12* (2013.01); *B32B 27/16* (2013.01); *B32B 27/302* (2013.01); *B32B 27/304* (2013.01); *B32B 27/306* (2013.01); *B32B 27/32* (2013.01); *B32B 27/34* (2013.01); *B32B 27/36* (2013.01); *B32B 27/365* (2013.01); *B32B 29/002* (2013.01); *B32B 29/005* (2013.01); *B32B 29/007* (2013.01); *B32B 29/02* (2013.01); *B32B 29/08* (2013.01); *B32B 37/12* (2013.01); *B65D 65/14* (2013.01); *B65D 65/40* (2013.01); *C08G 18/10* (2013.01); *C08G 18/12* (2013.01); *C08G 18/34* (2013.01); *C08G 18/36* (2013.01); *C08G 18/4854* (2013.01); *C08G 18/6625* (2013.01); *C08G 18/68* (2013.01); *C08G 18/7671* (2013.01); *C09J 5/04* (2013.01); *C09J 175/08* (2013.01);
(Continued)

(58) Field of Classification Search
CPC ...... C09J 175/06; C09J 175/14; C09J 175/16; C09J 175/04; C08G 18/14; C08G 18/36; C08G 18/38; C08G 18/4205; C08G 18/4233; C08G 18/4288; C08G 18/6662; C08G 8/12; C08G 18/10; C08G 18/307; C08G 18/3206; B32B 2439/70; B32B 2266/0278; C11C 3/00; C11C 3/02; C11C 3/025; C11C 3/03; C11C 3/04; C11C 3/06; C11C 3/10
USPC ......................................... 524/589; 525/453
See application file for complete search history.

(56) References Cited

U.S. PATENT DOCUMENTS 2,970,062 A    1/1961   Hauge et al.
2,970,123 A    1/1961   Rhodes et al.
(Continued)

FOREIGN PATENT DOCUMENTS

AU    198820276 A    2/1989
EP    0 306 162 A2    8/1989
(Continued)

OTHER PUBLICATIONS

Mubofu, Egid B. Castor oil as a potential renewable resource for the production of functional materials, Sustainable Chemical Processes, Springer Open, 4:11, p. 7 (Year: 2016).*
(Continued)

*Primary Examiner* — Lee E Sanderson
(74) *Attorney, Agent, or Firm* — Kristi Halloran

(57) ABSTRACT

Disclosed is a one-part, atmospheric curing, polyurethane adhesive composition that includes a polyurethane prepolymer that includes a reaction product of a polyol component and an isocyanate component, the polyol component comprising an unsaturated fatty acid esterified polyol comprising a reaction product of a first polyol and at least one of an ethylenically unsaturated oil and an ethylenically unsaturated fatty acid, the first polyol comprising at least three hydroxyl groups, and a % NCO of from at least 4% by weight to no greater than 7% by weight based on the weight of the prepolymer, the adhesive composition exhibiting a viscosity of no greater than 15,000 centipoise at 60° C., and a T-peel value of greater than 40 grams per 25 millimeter in no greater than 4 hours, a method of making a laminate, and a laminate that includes a one-part, atmospheric curing, polyurethane adhesive composition.

22 Claims, No Drawings

(51) Int. Cl.

| | |
|---|---|
| B32B 27/36 | (2006.01) |
| C08G 18/10 | (2006.01) |
| C08G 18/12 | (2006.01) |
| C08G 18/34 | (2006.01) |
| C08G 18/48 | (2006.01) |
| C09J 175/04 | (2006.01) |
| B32B 15/20 | (2006.01) |
| C08G 18/68 | (2006.01) |
| C08G 18/76 | (2006.01) |
| C08G 18/36 | (2006.01) |
| B32B 27/06 | (2006.01) |
| B32B 27/34 | (2006.01) |
| B32B 27/30 | (2006.01) |
| B32B 15/085 | (2006.01) |
| B32B 29/08 | (2006.01) |
| B32B 5/26 | (2006.01) |
| B32B 15/04 | (2006.01) |
| B32B 15/09 | (2006.01) |
| B32B 27/10 | (2006.01) |
| B32B 5/02 | (2006.01) |
| B32B 23/08 | (2006.01) |
| B32B 29/00 | (2006.01) |
| B32B 23/04 | (2006.01) |
| B32B 23/10 | (2006.01) |
| B32B 15/14 | (2006.01) |
| B32B 5/24 | (2006.01) |
| B32B 15/082 | (2006.01) |
| B32B 15/08 | (2006.01) |
| B32B 5/18 | (2006.01) |
| B32B 27/16 | (2006.01) |
| B32B 5/32 | (2006.01) |
| B32B 27/12 | (2006.01) |
| B32B 15/088 | (2006.01) |
| B32B 23/06 | (2006.01) |
| B32B 29/02 | (2006.01) |
| B32B 15/12 | (2006.01) |
| B32B 7/12 | (2006.01) |
| B32B 37/12 | (2006.01) |
| B65D 65/14 | (2006.01) |
| B65D 65/40 | (2006.01) |
| C08G 18/66 | (2006.01) |
| C09J 5/04 | (2006.01) |
| C09J 175/08 | (2006.01) |
| B65D 75/26 | (2006.01) |
| B65D 30/08 | (2006.01) |

(52) U.S. Cl.

CPC ....... B32B 2250/20 (2013.01); B32B 2250/22 (2013.01); B32B 2250/24 (2013.01); B32B 2250/26 (2013.01); B32B 2255/10 (2013.01); B32B 2255/205 (2013.01); B32B 2255/26 (2013.01); B32B 2262/02 (2013.01); B32B 2262/0253 (2013.01); B32B 2262/0261 (2013.01); B32B 2262/0276 (2013.01); B32B 2262/062 (2013.01); B32B 2266/025 (2013.01); B32B 2266/0207 (2013.01); B32B 2266/0278 (2013.01); B32B 2307/306 (2013.01); B32B 2307/54 (2013.01); B32B 2307/546 (2013.01); B32B 2307/7246 (2013.01); B32B 2307/732 (2013.01); B32B 2323/04 (2013.01); B32B 2323/046 (2013.01); B32B 2323/10 (2013.01); B32B 2367/00 (2013.01); B32B 2375/00 (2013.01); B32B 2439/70 (2013.01); B32B 2439/80 (2013.01); B32B 2457/00 (2013.01); B32B 2457/20 (2013.01); B32B 2553/00 (2013.01); B65D 31/02 (2013.01); B65D 75/26 (2013.01)

(56) References Cited

U.S. PATENT DOCUMENTS

| | | |
|---|---|---|
| 3,037,947 A | 6/1962 | Elkin |
| 3,332,896 A | 7/1967 | Burns |
| 3,489,711 A | 1/1970 | Nesheim |
| 4,217,254 A | 8/1980 | Legue |
| 4,720,510 A * | 1/1988 | Marks .................... C08J 9/0061 521/114 |
| 6,524,978 B1 | 2/2003 | Moore |
| 7,888,425 B2 | 2/2011 | Yang et al. |
| 8,382,937 B2 | 2/2013 | Simons |
| 2003/0106640 A1 | 6/2003 | Brinkman |
| 2004/0162385 A1* | 8/2004 | Krebs .................... C08G 18/10 524/589 |
| 2005/0143549 A1 | 6/2005 | Schijndel et al. |
| 2006/0051572 A1* | 3/2006 | Suzuki .................... B32B 7/12 428/354 |
| 2006/0074214 A1 | 4/2006 | Kesselmayer et al. |
| 2006/0155094 A1 | 7/2006 | Meckel et al. |
| 2006/0182957 A1 | 8/2006 | Simmons |
| 2009/0266482 A1 | 10/2009 | Garmann et al. |
| 2010/0010156 A1* | 1/2010 | Kollbach .................. B32B 7/12 524/589 |
| 2014/0255560 A1 | 9/2014 | Eklund et al. |
| 2014/0322400 A1 | 10/2014 | Carlson et al. |
| 2014/0343088 A1* | 11/2014 | Zhang ................ C07F 9/65522 514/283 |
| 2017/0000224 A1 | 1/2017 | Ostlund et al. |

FOREIGN PATENT DOCUMENTS

| | | |
|---|---|---|
| EP | 064 632 A1 | 3/1995 |
| JP | 59043072 A | 9/1984 |
| WO | 6057232 A | 1/1994 |
| WO | WO9967310 | 12/1999 |
| WO | WO2006/047746 A1 | 5/2006 |
| WO | WO2007/131959 A1 | 11/2007 |
| WO | WO2010/026002 | 3/2010 |
| WO | WO2011109720 A1 | 9/2011 |
| WO | WO2012/154909 A2 | 11/2012 |
| WO | WO2014072629 A1 | 5/2014 |

OTHER PUBLICATIONS

Akpan et al., Extraction, Characterization, and Modification of Castor Oil, Leonardo Journal of Sciences, Issue 8, 2006 (Year: 2006).*

Maisonneuve et al., Vegetable oils: a source of polyester for polyurethane materials, Oilseeds & fats Crops and Lipids, 2016, 23(05) (Year: 2016).*

* cited by examiner

ONE-PART POLYURETHANE ADHESIVE COMPOSITION, METHOD OF MAKING A LAMINATE, AND LAMINATE

CROSS-REFERENCE TO RELATED APPLICATIONS

This application claims the benefit of U.S. Provisional Application Ser. No. 62/280,447, filed on Jan. 19, 2016, which is incorporated herein.

BACKGROUND

The present invention is directed to a method of making a laminate, a laminate made thereby, and a one-part polyurethane adhesive composition. In particular, the present invention is directed to a method of making a laminate using a rapidly curing adhesive composition.

A variety of one part and two-part moisture curable polyurethane adhesive compositions exist. Two-part polyurethane adhesive compositions suffer from the disadvantage that the two parts must be metered and mixed prior to use and, because the reaction often starts almost immediately, they have a relatively short useful life time. Two-part polyurethane adhesive compositions also often exhibit relatively high viscosities.

Solvent-free one part polyurethane adhesive compositions eliminate the need for metering and mixing by a customer but often exhibit relatively slow cure rates. Solvent-free one part polyurethane laminating adhesive compositions often take a relatively long time to cure to a point sufficient to exhibit a suitable initial bond strength and sufficient to achieve a bond that results in film destruction, i.e., a point at which a film of the laminate is destroyed when an attempt is made to separate the two layers of the laminate bonded together through the adhesive composition.

Solvent-based one part polyurethane adhesive compositions can be undesirable because they include organic solvent and often fail in relatively rigorous environments such as sterilization chambers unless a second component, e.g., a crosslinking agent, is added to the composition.

Some polyurethane-based adhesive compositions include extractable primary aromatic amines (PAA). Some regulatory agencies limit the amount of extractable PAA in applications that come into contact with people. One such application is in food packaging. Agencies are concerned about the level of the extractable PAA because it can migrate into food that is later consumed by people. Accordingly, agencies impose limits on how much extractable PAA can migrate into food.

Conventional solvent-free isocyanate-based adhesives are useful in making flexible packaging laminates for food packaging. However, these isocyanate-based adhesives can produce high levels of extractable PAA through the reaction of monomeric aromatic diisocyanates with water. For example, 4,4'-diphenylmethane diisocyanate (4, 4'-MDI, a monomeric aromatic diisocyanate) can react with water to form 4,4'-diphenylmethane diamine (4,4'-MDA), which is a PAA. This reaction is shown below:

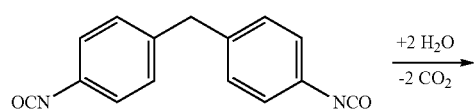

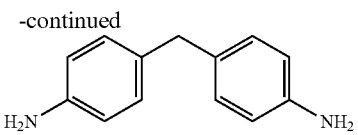

When water reacts with a monomeric aromatic diisocyanate (e.g., an MDI) to form PAA during the curing of the adhesive, the PAA can gradually be consumed by its continuing reaction with isocyanates that are still present in the adhesive. Water in foods that come into contact with the laminate can diffuse into the adhesive and react with any residual monomeric aromatic diisocyanates to form PAA. Also, any monomeric aromatic diisocyanates that diffuses through the laminate can also react with the water and form PAA. The PAA formed in any of these manners and extracted into food is called extractable PAA. Food simulants, such as 3% aqueous acetic acid, are used to determine the amount of extractable PAA. As the monomeric aromatic diisocyanates are consumed during the curing of the adhesive, the amount of extractable PAA will become smaller and smaller or in other words decay. A fast rate of PAA decay is desirable for food packaging applications.

There is a need for a one part polyurethane adhesive composition that exhibits low viscosity, good initial bond strength to polymeric film substrates, a useful rate of cure, and a useful rate of PAA decay.

SUMMARY

In one aspect, the invention features a method of making a laminate. The method includes applying a one-component, rapidly curing adhesive composition to a first substrate, and contacting the adhesive composition with a second substrate. The adhesive composition includes a polyurethane prepolymer that is a reaction product of a polyol component and an isocyanate component. The polyol component includes an unsaturated fatty acid esterified polyol that is a reaction product of a first polyol and at least one of an ethylenically unsaturated oil and an ethylenically unsaturated fatty acid. The first polyol is selected from trimethylol propane, ditrimethylol propane, glycerol, pentaerythritol, dipentaerythritol, trimethylolethane, xylitol, sorbitol, mannitol, sucrose, castor oil, and combinations thereof. The adhesive exhibits a PAA Food Migration Value that is less than 35% of the Control within 3 days. In one embodiment, the adhesive composition is atmospheric curable.

In one embodiment, the adhesive exhibits a T-peel value of greater than 40 g/25 mm within 4 hours, when tested according to the T-Peel Adhesion Test Method. In another embodiment, the resulting laminate exhibits a T-peel value of greater than 250 g/25 mm in less than 6 hours.

In one embodiment, the ethylenically unsaturated oil is an ethylenically unsaturated vegetable oil.

In one embodiment, the polyurethane prepolymer has percentage isocyanate (% NCO) of from about 0.5% to about 10%, based on the weight of the prepolymer. In one embodiment, the polyol component includes at least one additional polyol that is different from the aforementioned esterified polyol. In another embodiment, the prepolymer % NCO is from about 0.5% to about 6% based on the weight of the prepolymer.

In one embodiment, the isocyanate component is present relative to the polyol component at an NCO/OH ratio of from about 1.5:1 to about 3:1.

In one embodiment, the ethylenically unsaturated oil is an ethylenically unsaturated vegetable oil. In some embodiments, the ethylenically unsaturated vegetable oil comprises soybean oil, linseed oil, tung oil, sunflower oil, safflower oil, tall oil, olive oil, cottonseed oil, or combinations thereof. In some embodiments, the unsaturated fatty acid esterified polyol is a reaction product of pentaerythritol and an ethylenically unsaturated vegetable oil. In other embodiments, the unsaturated fatty acid esterified polyol is a reaction product of pentaerythritol and soy bean oil. In another embodiment, the ethylenically unsaturated fatty acid comprises oleic acid, linoleic acid, linolenic acid, eicosadienoic acid, arachidonic acid, or combinations thereof.

In one embodiment, the unsaturated fatty acid esterified polyol is a reaction product of from about 5% by weight to about 35% by weight of the first polyol and from about 65% by weight to about 95% by weight of at least one of the ethylenically unsaturated oil and the ethylenically unsaturated fatty acid.

In another embodiment, the adhesive composition further includes an additive that includes plasticizers, fillers, adhesion modifiers, catalysts, or combinations thereof.

In another aspect, the invention features a laminate including a first substrate, a second substrate, and a cured adhesive derived from any one of the aforementioned rapidly curing adhesive compositions. The first substrate is bonded to the second substrate through the cured adhesive.

In yet another aspect, the invention features a package that includes a product, and any one of the aforementioned laminates at least partially surrounding the product.

In one embodiment, the package includes a food product and any one of the aforementioned laminates at least partially surrounding the food product.

In other aspects, the invention features a one-part, atmospheric curing, polyurethane adhesive composition that includes a polyurethane prepolymer that includes a reaction product of a polyol component and an isocyanate component, the polyol component including an unsaturated fatty acid esterified polyol that includes a reaction product of a first polyol and at least one of an ethylenically unsaturated oil and an ethylenically unsaturated fatty acid, the first polyol including at least three hydroxyl groups, and a % NCO of from at least 4% by weight to no greater than 7% by weight based on the weight of the prepolymer, the adhesive composition exhibiting a viscosity of no greater than 15,000 centipoise (cP) at 60° C., and a T-Peel value of greater than 40 grams per 25 millimeter (g/25 mm) in no greater than 4 hours.

In one embodiment, the adhesive composition exhibits a viscosity of no greater than 11,000 centipoise (cP) at 60° C. In other embodiments, the adhesive composition exhibits a viscosity of no greater than 9,000 cP at 60° C.

In some embodiments, the adhesive composition exhibits a PAA Food Migration Value of no greater than 10 microgram/kilogram within 3 days. In other embodiments, the adhesive composition exhibits a PAA Food Migration Value that is less than 35% of the Control within 3 days.

In other embodiments, the adhesive composition exhibits a T-peel value of greater than 250 g/25 mm in less than 6 hours.

In another embodiment, the adhesive composition further includes a second polyol comprising a polyether polyol.

In one embodiment, the prepolymer comprises from at least 4% by weight NCO to no greater than 6% by weight NCO based on the weight of the prepolymer.

In other aspects, the invention features a method of making a laminate that includes applying a one-component adhesive composition disclosed herein to a first substrate, and contacting the adhesive composition with a second substrate.

In another aspect, the invention features a laminate that includes a first substrate, a second substrate that includes a sealant film, and a cured adhesive composition derived from the above-described adhesive composition, the first substrate being bonded to the second substrate through the cured adhesive composition. In one embodiment, the first and the second substrates are flexible substrates that include a polymer film selected from the group consisting of a metallized polymer film, polyethylene terephthalate, polypropylene, polyethylene, metallized polypropylene, metalized polyethylene terephthalate, polyamide, metal foil, paper, polylactic, and combinations thereof. In some embodiments, the ethylenically unsaturated oil or fatty acid includes an ethylenically unsaturated vegetable oil selected from the group consisting of soybean oil, linseed oil, tung oil, and combinations thereof.

In one embodiment, the laminate exhibits a PAA Food Migration Value of no greater than 10 micrograms/kilogram within 3 days.

In another aspect, the invention features a package that includes a product, and an above-described laminate at least partially surrounding the product. In one embodiment, the product is a food product.

In other aspects, the invention features a laminate that includes a first substrate, a cured adhesive composition derived from a polyurethane prepolymer that is a reaction product of a polyol component and an isocyanate component, the polyol component including an unsaturated fatty acid esterified polyol that is a reaction product of a first polyol and at least one of an ethylenically unsaturated oil and an ethylenically unsaturated fatty acid, the first polyol being selected from the group consisting of trimethylol propane, ditrimethylol propane, glycerol, pentaerythritol, dipentaerythritol, trimethylolethane, xylitol, sorbitol, mannitol, sucrose, castor oil, and combinations thereof, and a second substrate bonded to the first substrate through the cured adhesive composition, the laminate exhibiting at least one of a PAA Food Migration Value of no greater than 10 micrograms/kilogram within 2 days and a T-Peel value of at least 40 g/25 mm within no greater than four hours. In some embodiments, the laminate exhibits a PAA Food Migration Value of no greater than 10 micrograms/kilogram within 1 day. In other embodiments, the laminate exhibits no measurable primary aromatic amines within 1 day.

The invention features a one part polyurethane adhesive composition that exhibits low viscosity and a good initial bond strength to polymeric film substrates.

The invention features a one part polyurethane adhesive composition that exhibits a useful rate of cure and a useful rate of PAA decay.

GLOSSARY

In reference to the invention, these terms have the meanings set forth below:

The term "rapidly curing" refers to a composition that cures to exhibit a T-Peel value of greater than 40 g/25 mm within 4 hours, when tested according to the herein described T-Peel Adhesion test method.

The term "ethylenically unsaturated oil or fatty acid" refers to an at least partially unsaturated oil, an at least partially unsaturated fatty acid, and mixtures thereof.

The term "unsaturated oil or fatty acid" as used herein has the same meaning as the term "ethylenically unsaturated oil or fatty acid."

The term "unsaturated fatty acid esterified polyol" is herein interchangeable with the term "esterified polyol".

The term "the Control" refers to a laminate prepared according to the Control Laminate Preparation Method set forth in the Example section below.

DETAILED DESCRIPTION

The method of making a laminate includes coating a first substrate with a rapidly curing adhesive composition and contacting the adhesive composition with a second substrate. The resulting laminate preferably exhibits a primary aromatic amine (PAA) Food Migration Value of no greater than 35%, no greater than 30%, or even no greater than 15%, relative to that of the Control after 3 days, after 2 days, or even after 1 day when tested according to the PAA Extraction Test Method I, or even exhibits a PAA Food Migration Value of no greater than 10 micrograms/kilogram (μg/kg), or even no measurable PAA Food Migration Value within 3 days, within 2 days, or even within 1 day. The laminate also preferably is substantially free of, or even free of, extractable primary aromatic amines after 3 days, after 2 days, or even after 1 day when tested according to the PAA Extraction Test Method I.

The adhesive composition is a rapidly curing polyurethane composition that includes a polyurethane prepolymer. The polyurethane prepolymer is the reaction product of a polyol component and an isocyanate component. The polyol component and the isocyanate component are blended together in amounts such that the equivalent ratio of isocyanate groups (NCO) from the isocyanate component to the hydroxyl groups (OH) from the polyol component (i.e., NCO/OH ratio) is from about 1.5:1 to about 3:1. The polyurethane prepolymer is preferably a liquid at 60° C., and has a viscosity that allows it to be easily processed. Useful polyurethane prepolymers have a viscosity of from about 6,000 cP, to no greater than 15,000 cP, from about 9,000 cP to no greater than 15,000 cP, or even from about 9000 cP to no greater than 11,000 cP at 60° C.

The polyurethane prepolymer has a final percentage isocyanate (% NCO) of from about 0.5% by weight to about 10% by weight, from about 0.5% by weight to about 6%, by weight, from at least 3% by weight to about 7% by weight, from about 4% by weight to about 7% by weight, or even from about 4% by weight to about 6% by weight, based on the weight of the prepolymer.

The adhesive composition can be formulated to be a one-component (i.e., one-part) polyurethane adhesive composition that includes the rapidly curing polyurethane prepolymer. Optionally, the adhesive composition is formulated as a two-component (i.e., two-part) adhesive composition that includes a polyol component and an isocyanate component, which are mixed together prior to being coated to a substrate.

The rapidly curing adhesive composition preferably exhibits a PAA Food Migration Value of no greater than 35% of the Control, no greater than 30% of the Control, or even no greater than 15% of the Control within 3 days, within 2 days, or even within 1 day when tested according to the PAA Extraction Test Method II for an adhesive composition. The adhesive composition also preferably exhibits a PAA Food Migration Value of no greater than 10 μg/kg, or even no measurable PAA Food Migration Value within 3 days, within 2 days, or even within 1 day. The adhesive composition also preferably is substantially free of, or even free of, extractable primary aromatic amines (PAA) within 3 days, within 2 days, or even within 1 day when tested according to the PAA Extraction Test Method II for an adhesive composition.

The adhesive composition is formulated to cure rapidly so as to exhibit initial adhesive properties, e.g., high initial green strength. The adhesive composition provides a strong initial adhesive bond to a variety of film substrates that is comparable to, or even superior to, that of conventional laminating polyurethane adhesives. One measure of the bond strength of an adhesive composition is T-Peel Adhesion value. The adhesive composition and laminates made therefrom preferably exhibit a T-Peel adhesion value of greater than 40 grams per 25 millimeter (g/25 mm), greater than 50 g/25 mm, or even greater than 70 g/25 mm, in less than 4 hours or even in less than 1 hour, or even a T-Peel value of greater than 250 grams per 25 millimeter (g/25 mm) in less than 6 hours or even in less than 5 hours, when tested according to the T-Peel Adhesion Test Methods I and II, respectively.

The adhesive composition also is formulated to quickly (e.g., in less than 6 hours) develop sufficient bond strength to allow for rapid processing of the laminate, as well as other assembled articles. The adhesive composition preferably exhibits sufficient fixturing strength to enable laminates made therefrom to be cut and processed within from 4 to 12 hours from the time the lamination was created. The adhesive composition can also run at higher line speed.

The adhesive composition also is sufficiently cured within no greater than 3 days, no greater than 2 days, or even no greater than 1 day such that destruction of at least one of the film substrates occurs when the adhesive composition is tested according to the T-Peel Adhesion Test Method II.

The adhesive composition can be formulated to be substantially solvent-free, such as including no greater than 0.5% solvent, or even solvent-free. When solvent-free, the adhesive composition preferably exhibits a viscosity of no greater than 15,000 centipoises (cP), no greater than 11,000 cP, or no greater than 9,000 cP, or even no greater than 6,000 cP at 140° F. (60° C.) when tested according to the Viscosity Test Method I for Solvent-free Adhesive Compositions. The solvent-free adhesive composition has a workable viscosity and exhibits a highly extended pot life. Preferably the solvent-free adhesive composition exhibits less than a 5% increase in viscosity over an eight hour period at the application temperature, e.g., from about 60° C. to about 80° C.

The adhesive composition optionally is formulated to be solvent-based. Suitable solvents for use in the adhesive composition dissolve or disperse the polyurethane prepolymer of the adhesive thereby creating a low viscosity solution, which facilitates techniques used to apply the adhesive composition including such application techniques as spraying, laminating, brushing, and rolling. Examples of useful solvents include ethyl acetate, methyl acetate, butyl acetate, acetone, methyl ethyl ketone, methyl amyl ketone, methyl isobutyl ketone, toluene, xylene, and combinations thereof. The amount of the solvent varies depending on application equipment and desired coat weight, and ranges from about 10% by weight to about 80% by weight based on the total weight of the adhesive composition.

Useful solvent-based adhesive compositions preferably exhibit a viscosity of no greater than 25 seconds, no greater than 23 seconds, no greater than 21 seconds, or even no greater than 19 seconds when tested according to the Viscosity Test Method II for Solvent-based Adhesive Compositions.

Polyol Component

The polyol component used to form the polyurethane prepolymer of the adhesive composition preferably is a liquid at ambient temperature, e.g., 25° C., and has a viscosity of from about 250 cP, from about 1,000 cP, or even from about 2,000 cP to no greater than about 20,000 cP, to no greater than about 15,000 cP, to no greater than about 10,000 cP, to no greater than about 8,000 cP, or even to no greater than about 5,000 cP at 25° C.

Useful polyol components include unsaturated fatty acid esterified polyols, which can be a single unsaturated fatty acid esterified polyol, or a combinations of different unsaturated fatty acid esterified polyols. The polyol component optionally includes at least one additional polyol that is different from the unsaturated fatty acid esterified polyol.

Unsaturated Fatty Acid Esterified Polyol

Suitable unsaturated fatty acid esterified polyols include those unsaturated fatty acid esterified polyols that have a number average molecular weight (Mn) of from about 100 g/mole to about 2,000 g/mole, or even from about 200 g/mole to about 1,000 g/mole, and a hydroxyl (OH) functionality of no greater than 3, from about 1.25 to about 3, or even from about 1.5 to about 2.5. Useful unsaturated fatty acid esterified polyol have a hydroxyl (OH) number of from about 50 mg KOH/g, from about 100 mg KOH/g, or even from about 110 mg KOH/g to about 300 mg KOH/g, to about 190 mg KOH/g, to about 170 mg KOH/g, or even to about 150 mg KOH/g.

Useful unsaturated fatty acid esterified polyols include, e.g., the reaction product of a first polyol and an ethylenically unsaturated oil, the reaction product of a first polyol and an ethylenically unsaturated fatty acid, and combinations thereof. Useful unsaturated fatty acid esterified polyols include the reaction product of from about 5% by weight to about 35% by weight of a first polyol and from about 65% by weight to about 95% by weight of at least one of an ethylenically unsaturated oil and an ethylenically unsaturated fatty acid.

Examples of preferred first polyols that include at least two hydroxyl groups per molecule include trimethylol propane, ditrimethylol propane, glycerol, pentaerythritol, dipentaerythritol, trimethylolethane, xylitol, sorbitol, mannitol, sucrose, castor oil, and combinations thereof.

Examples of useful ethylenically unsaturated oils and ethylenically unsaturated fatty acids include those ethylenically unsaturated oils and fatty acids having an iodine value of from about 90 to about 200, or even from about 110 to about 185. Useful ethylenically unsaturated oils include, e.g., oils known as "drying oil" and "semi-drying oil," vegetable oils include soybean oil, linseed oil, tung oil, castor oil, sunflower oil, safflower oil, tall oil, olive oil, cottonseed oil, and combinations thereof. Preferably, the ethylenically unsaturated oil is an ethylenically unsaturated vegetable oil.

Useful ethylenically unsaturated oils also include partially hydrogenated natural oils, genetically modified natural oils, and combination thereof. Examples of such oils include high oleic safflower oil, high oleic soybean oil, high oleic peanut oil, high oleic sunflower oil (such as NuSun sunflower oil), high oleic canola oil, high erucic rapeseed oil (such as Crumbe oil), and combinations thereof.

Examples of preferred ethylenically unsaturated fatty acids include oleic acid, linoleic acid, linolenic acid, eicosadienoic acid, arachidonic acid, and combinations thereof.

The reaction of a first polyol and the unsaturated oil or fatty acid to form the unsaturated fatty acid esterified polyol optionally is catalyzed with a catalyst. Examples of useful catalysts include calcium naphthenate, lithium neodecanoate, zinc acetate, tin oxide, lithium hydroxide, potassium hydroxide, and combinations thereof.

Optional Additional Polyol

The optional additional polyol that can be used to form the polyurethane prepolymer preferably is liquid at ambient temperature, e.g., 25° C., and preferably has a hydroxyl functionality of at least about 1.5, at least about 2, at least about 3, no greater than about 4, or even no greater than about 3.5. Examples of useful classes of additional polyols include polyether polyols, polyester polyols, polyether/polyester polyols, polycarbonate polyols, hydroxyl functional natural oil polyols, and combinations thereof.

The optional additional polyol(s) is selected within the constraints that the additional polyol or combinations of additional polyols are liquid at ambient temperature, and that the polyol component is liquid at ambient temperature. Within these constraints, useful additional polyol(s) have hydroxyl numbers that vary over a wide range including, e.g., from about 25 to about 1,200, or even from about 80 and about 1,000. The optional additional polyol preferably has a number average molecular weight ($M_n$) of from about 100 g/mole to about 5,000 g/mole.

Suitable polyether polyols include those polyether polyols having a number average molecular weight ($M_n$) of no less than 100 g/mole, or even from about 100 g/mole to about 2500 g/mole. Useful polyether polyols can be obtained from the polymerization of a cyclic oxide, e.g., ethylene oxide, propylene oxide, butylene oxide, and tetrahydrofuran, or by the addition of one or more such oxides to polyfunctional initiators having at least two active hydrogens including, e.g., water, polyhydric alcohols (e.g., ethylene glycol, propylene glycol, diethylene glycol, cyclohexane dimethanol, glycerol, trimethylol-propane, pentaerythritol and bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene) diols and triols obtained by the simultaneous or sequential addition of ethylene oxide and propylene oxide to appropriate initiators, and polytetramethylene ether glycols obtained by the polymerization of tetrahydrofuran. Examples of preferred polyether polyols include a poly(alkylene oxide), such as poly(propylene oxide), poly(ethylene oxide) and ethylene oxide/propylene oxide copolymer, with poly(propylene oxide) being most preferred.

Useful polyester polyols include those polyester polyols prepared from the reaction product of polycarboxylic acids, their anhydrides, their esters or their halides, and a stoichiometric excess polyhydric alcohol. Suitable polycarboxylic acids include dicarboxylic acids and tricarboxylic acids including, e.g., aromatic dicarboxylic acids, anhydrides and esters thereof (e.g. terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butane-tricarboxylic acid, decanedicarboxylic acid, octadecanedicarboxylic acid, dimeric acid, dimerized fatty acids, trimeric fatty acids, and fumaric acid), alicyclic dicarboxylic acids (e.g. 1,3-cyclohexanedicarboxylic acid, and 1,4-cyclohexanedicarboxylic acid), and combinations thereof.

Examples of suitable polyhydric alcohols (i.e., polyols) from which the polyester polyols can be derived include aliphatic polyols, e.g., ethylene glycols, propane diols (e.g., 1,2-propanediol and 1,3-propanediol), butane diols (e.g., 1,3-butanediol, 1,4-butanediol, and 1,2-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, polyethylene glycols, propylene glycol, polypropylene glycols (e.g., dipropylene glycol and tripropylene glycol), neopentylglycol, 1,4-cyclohexanedimethanol, 1,4-cyclohexanediol, dimer diols, hydrogenated bisphenol A, hydrogenated bisphenol F, polycarprolactone polyols, tetramethylene glycol, polytetramethylene glycol, 3-methyl-1,5-pentanediol, 1,9-nonanediol, 2-methyl-1,8-octanediol, trimethylolpropane, glycerin, pentaerythritol, sorbitol, glucose, and combinations thereof.

Suitable natural oil polyols have hydroxyl functionality of from about 1 to about 8, and preferably from about 1.5 to about 4. Examples of suitable natural oil polyols include hydroxy functionalized oils that are isolated from, derived from, or manufactured from natural oils including animal and vegetable oils, preferably vegetable oils. Examples of vegetable and animal oils that may be used include soybean oil, safflower oil, linseed oil, corn oil, sunflower oil, castor oil, olive oil, canola oil, sesame oil, cottonseed oil, palm oil, rapeseed oil, tung oil, fish oil, and blends thereof. Other suitable oil polyols include polyols derived from modified natural oils including, e.g., partially hydrogenated natural oils, natural epoxidized oils, genetically modified natural oils, and combinations thereof. Examples of such oils include, but are not limited to, high oleic safflower oil, high oleic soybean oil, high oleic peanut oil, high oleic sunflower oil (such as NuSun sunflower oil), high oleic canola oil, and high erucic rapeseed oil (such as Crumbe oil).

Suitable polycarbonate polyols include, e.g., polycarbonate polyols derived from dimethyl carbonate and a polyol, suitable examples of which include aliphatic polyols, e.g., ethylene glycols, propane diols (e.g., 1,2-propanediol and 1,3-propanediol), butane diols (e.g., 1,3-butanediol, 1,4-butanediol, and 1,2-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycols, propylene glycol, polypropylene glycols (e.g., dipropylene glycol and tripropylene glycol), neopentyl glycol, 1,4-cyclohexanedimethanol, 1,4-cyclohexanediol, dimer diols, bisphenol A, bisphenol F, hydrogenated bisphenol A, hydrogenated bisphenol F, tetramethylene glycol, polytetramethylene glycol, 3-methyl-1,5-pentanediol, 1,9-nonanediol, 2-methyl-1,8-octanediol, trimethylolpropane, glycerin, pentaerythritol, sorbitol, glucose, and combinations thereof, as well as polyols derived from organic oxides such as ethylene oxide and propylene oxide.

Isocyanate Component

The isocyanate component used to prepare the polyurethane prepolymer is a diisocyanate, useful examples of which include, e.g., 4,4'-diphenylmethane diisocyanate (MDI) and its isomers, hydrogenated MDI ($H_{12}$-MDI), toluene diisocyanate (TDI), xylene diisocyanate (XDI), hexamethylene diisocyanate (HDI), tris-(hexamethylene isocyanate)isocyanurate, isophorone diisocyanate, tetramethylxylene diisocyanate (TMXDI), modified diphenylmethane diisocyanate such as carbodiimide-modified diphenylmethane diisocyanate, allophanate-modified diphenylmethane diisocyanate, biuret-modified diphenylmethane diisocyanate, polymeric diphenylmethane diisocyanate, and combinations thereof.

Catalyst

The adhesive composition optionally includes a catalyst to increase the cure reaction rate. Suitable catalysts include, e.g., metallic carboxylates and dibutyl tin dilaurate. Useful metallic carboxylates include, e.g., cobalt carboxylates, manganese carboxylates, and mixtures thereof. Other useful catalysts include amine catalysts, e.g., 2,2'-dimorpholinodicthylether (DMDEE). When a catalyst is present, the adhesive composition includes from about 0.01% by weight to about 0.5% by weight catalyst based on the weight of the adhesive composition.

In some embodiments, a moisture-curing catalyst (e.g., amino-trialkylamines) is present during the formation of the polyurethane prepolymer and becomes incorporated into the backbone of the polyurethane prepolymer.

Other Additives

The adhesive composition optionally includes other additives including, e.g., antioxidants, plasticizers including wax and oil, adhesion promoters, catalysts, catalyst deactivators, rheology modifiers, colorants (e.g., pigments and dyes), surfactants, waxes, and mixtures thereof.

Laminate

The adhesive compositions disclosed herein are useful in methods of making articles and laminates that includes at least a first substrate and a second substrate bonded to the first substrate through any one of the aforementioned adhesive compositions. The first and the second substrates may be of the same or a different material. Preferably, at least one of the first and second substrates is a flexible film.

The laminate may be a multi-layer laminate, which has more than two substrates laminated together with any one of the aforementioned adhesive compositions in between each of the two layers. Alternately or in addition, other suitable adhesive compositions can be used to bond at least two of the layers of a multi-layer laminate together.

The articles and laminates can be prepared from a variety of substrates and in particular flexible films including, e.g., metal foils (aluminum foil), polymer films and metalized polymer films prepared from polymers including, e.g., polyolefins (e.g., polypropylene, polyethylene, low density polyethylene, linear low density polyethylene, high density polyethylene, polypropylene, and oriented polypropylene; copolymers of polyolefins and other comonomers), metalized polyolefins (e.g., metalized polypropylene), metalized polyethylene terephthalate, ethylene-vinyl acetates, ethylene-methacrylic acid ionomers, ethylene-vinyl-alcohols, polyesters (e.g. polyethylene terephthalate), polycarbonates, polyamides (e.g. Nylon-6 and Nylon-6,6), polyvinyl chloride, polyvinylidene chloride, polylactic acid, cellulosics, polystyrene, cellophane, paper, and retortable packaging laminate materials. The thickness of a film may vary, but flexible films typically have a thickness of from about 5 micrometers (μm) to about 150 μm, more typically from about 8 μm to about 100 μm. The surface of the substrate can be surface treated to enhance adhesion using any suitable method including, e.g., corona treatments, chemical treatments and flame treatments.

Other suitable substrates include, e.g. woven webs, non-woven webs, paper, paperboard, and cellular flexible sheet materials (e.g., polyethylene foam, polyurethane foam and sponge and foam rubber). Woven and non-woven webs can include fibers including, e.g., cotton, polyester, polyolefin, polyamide, and polyimide fibers. The substrate can be constructed to exhibit many useful properties. Preferably the substrate exhibits properties useful for flexible packaging and retortable packaging. Such properties include, e.g., high tensile strength, vapor barrier properties, flexibility, rigidity, resistance to thermal degradation and combinations thereof. The disclosed adhesive compositions are especially suited for manufacturing flexible packaging and in particular flexible food packaging.

Methods of Making and Using

Any suitable method of making flexible laminates can be used to make the laminate. One useful method includes applying the adhesive composition in liquid form to a first substrate, e.g., a flexible film, and then contacting the applied adhesive composition with a second substrate, e.g., the same or different flexible film, so as to bond the two substrates together through the adhesive composition to form a laminate.

The adhesive composition can be applied to a substrate using any suitable coating process including, e.g., air knife, trailing blade, spraying, brushing, dipping, doctor blade, roll coating, multi-roll transfer coating, gravure coating, offset gravure coating, rotogravure coating, or combinations thereof. Useful application (i.e., coating) temperatures range from about 20° C. to about 80° C. Useful application temperatures for coating solvent-less adhesive compositions range from about 60° C. to about 80° C. and useful application temperatures for coating solvent-based composition range from about 20° C. to about 40° C. Lower temperatures are preferred during the solvent-less laminating process in order to extend the working life of the adhesive composition. The coating weight of the adhesive may vary broadly depending on the desired properties of the laminate. Useful adhesive coating weights include, e.g., from about 0.8 grams per square meter ($g/m^2$) to about 6.5 $g/m^2$, or even from about 0.8 $g/m^2$ to 2.5 $g/m^2$.

The adhesive surface of the first film substrate coated with the adhesive composition is contacted with a second film substrate with or without the application of pressure, to form a laminate. The second substrate may be of the same or different material relative to the first substrate. The second substrate can be applied to the adhesive by the application of pressure and temperature commonly used in the film laminating equipment.

To make a multi-layered laminate, the laminating procedure herein described can be repeated a number of times, so that it is possible to produce laminates that include more than two bonded layers. In some embodiments, when manufacturing flexible laminates, the adhesive composition can be processed on laminator units at line speeds of no greater than 2000 feet/minute (min), no greater than about 1500 feet/min, or even no greater than about 1000 feet/min.

The resulting laminates can be converted into a variety of packaging products, especially food packaging products including, e.g., bags, pouches, stand-up pouches, zippered pouches, and combinations thereof.

While the disclosed adhesive compositions are useful for making laminates for use in food packaging products, it is understood that they can be used to make laminates that can be used to make other products for a variety of purposes including, e.g., packaging for industrial applications, packaging for consumer applications such as cleaning products, cosmetics and health and beauty products, packaging for agricultural and veterinary applications such as feed, pesticides and soil, packaging for medical and pharmaceutical applications, and laminates for use in photovoltaic structures, flexible electronic assemblies, general industrial laminates, and flexible optical displays.

The present disclosure may be better understood with reference to the following examples. These examples are intended to be representative of specific embodiments of the disclosure and are not intended to be limiting to the scope of the disclosure.

All parts, ratios, percentages, and amounts stated herein and in the examples are by weight unless otherwise specified.

EXAMPLES

Test Methods

Viscosity Test Method I for Solvent-Free Adhesive Compositions

The viscosity of a solvent-free adhesive composition is determined using a Brookfield Programmable Rheometer Model DV-III using Spindle #27 at 20 RPM and about 10.5 gram (g) of sample material at 60° C.±1° C. and/or 90° C.±1° C.

Viscosity Test Method II for Solvent-Based Adhesive Compositions

The viscosity of a solvent-based adhesive composition is measured using a Zahn Cup (EZ-2 viscosity). The solvent-based adhesive composition is placed in an EZ-2 Zahn Cup and allowed to drain through the hole at the bottom. The time it takes to drain the cup is recorded in seconds. An acceptable measurement for lamination is considered to be from 19 seconds to 25 seconds.

Method of Determining Molecular Weight

Weight average molecular weight ($M_w$) and number average molecular weight ($M_n$) are determined according to ASTM D 5296-05 entitled "Standard Test Method for Molecular Weight Averages and Molecular Weight Distribution of Polystyrene by High Performance Size Exclusion Chromatography."

Method of Determining Hydroxyl (OH) Number

Hydroxyl number (OH number) is determined according to ASTM E 222-00 entitled "Standard Test Method for Hydroxyl Groups Using Acetic Anhydride Acetylation."

Method of Determining Percentage Isocyanate (% NCO)

Percentage isocyanate (% NCO) of a prepolymer is determined according to ASTM D2572-97 entitled "Standard Test Method for Isocyanate Groups in Urethane Materials or Prepolymers."

Method of Determining Iodine Value

Iodine value is determined according to ASTM D5768 entitled "Standard Test Method for Determination of Iodine Value of Tall Oil Fatty Acids."

T-Peel Adhesion Test Method I (for Testing a Laminate)

Adhesive strength is measured according to the T-Peel Adhesion test method as follows: An adhesively bonded laminate is placed in a temperature and humidity controlled environment controlled to a temperature of 25° C. and 50% relative humidity to cure the adhesive composition of the laminate during the testing window. The adhesive strength of the laminate is evaluated at various intervals of time (e.g. after 1 hour, after 2 hours, after 4 hours, after 24 hours, after 48 hours, and after 7 days) by cutting the laminate into 1 inch wide by 5 inch long strips. These strips are opened at the edges of the laminate to create two tabs of film. These tabs are placed in the grips of a tension testing machine (e.g., an Instron) and pulled apart with a constant force at a rate of 12 inch/min for a total length of 1.5 inch. The maximum force achieved for each sample tested is recorded and the results are averaged. The results are reported as T-Peel value in units of grams of force per 25 millimeter (g/25 mm), optionally with an interval of time, which reflects the intervening period of time between when the laminate was created and when the laminate was tested. A bond result is labelled as "destruct" if the act of separating the films causes a loss of integrity of one or both films, rather than a failure in the adhesive.

T-Peel Adhesion Test Method II (for Testing an Adhesive Composition)

The T-Peel Adhesion Test Method II is conducted according to T-Peel Adhesion Test Method I with the exception that the laminate used in the test method is prepared according to the Laminate Preparation Method set forth below with the further exception that the first substrate is a polyethylene terephthalate film. The second substrate is the low density polyethylene having a film thickness of from about 25 microns to about 38 microns specified in the PAA Extraction Test Method.

PAA Extraction Test Method I for a Laminate

The amount of extractable PAA present in a laminate, which is expressed as the PAA Food Migration Value, is determined at various time intervals after lamination (e.g., 1 day, 2 days, or 3 days) according to the following procedure. The outer 5-10 wraps from a roll of the laminate to be tested is cut off and discarded. A pouch with an internal contact area of 4 decimeters squared ($dm^2$) is then made from the laminate such that a sealant film layer of the laminate forms the interior surface of the pouch. The pouch is filled with 200 milliliter (mL) of 3% aqueous acetic acid solution (i.e., the extraction solution), which is used to simulate food inside of the pouch. The pouch is then sealed and placed in a 70° C. oven for one hour, and thereafter turned over and left in the 70° C. oven for another hour. At that point the pouch is immediately emptied into a glass container. The extraction solution is then analyzed for extractable PAA content using high performance liquid chromatography (HPLC) at a wavelength of 235 nanometers (nm) using pure 4,4'-methylenedianiline, 2,4'-methylenedianiline, and 2,2'-methylenedianiline isomers as standards. The HPLC system included a C8 reverse phase column (at a column temperature of 40° C.), a mobile phase of acetonitrile and aqueous pH 7.4 phosphate buffer, a flow rate of 1.0 mL/min, and gradient elution.

The PAA Food Migration Value is calculated by normalizing the amount of extracted PAA obtained from the HPLC testing to the amount of extracted PAA obtained for a laminate having an internal surface area of 6 $dm^2$ in contact with 1 kilogram (kg) of foodstuff. This yields a PAA Food Migration Value in units of microgram/kilogram (μg/kg) or parts per billion (ppb). PAA Food Migration Value is reported in units of μg/kg or ppb, optionally with an interval of time, which reflects the intervening period of time between when the laminate was created and when the laminate was tested.

% of the Control PAA Food Migration Value

The % of the Control PAA Food Migration Value of a sample laminate (PFMVSL) is a comparison of the level of PAA extractables in the sample laminate (PESL) to the level of PAA extractables in the control laminate (PECL) prepared as described below. The % of the Control PAA Food Migration Value of the sample laminate is calculated as a percentage of the PAA extractables in the control laminate (i.e., PESUPECL*100=PFMVSL) and is reported as Percentage of the Control (% of the Control) at an interval of time, which is measured from the point in time at which the laminate was created to the point in time at which the laminate was tested. The sample laminate to be tested (i.e., the pouch with food simulant) is prepared and tested at the same time and under the same test conditions as that of the control laminate.

PAA Extraction Test Method II for an Adhesive Composition

The amount of extractable PAA of an adhesive composition (i.e., the PAA Food Migration Value of the adhesive composition) is determined according to the PAA Extraction Test Method for Laminate with the exception that the roll of laminate used in the test method is prepared according to the Laminate Preparation Method described below. At predetermined time intervals after the laminate has been prepared (e.g., 1 day, 2 days, or 3 days), the laminate is subjected to the PAA Extraction Test Procedure.

Laminate Preparation Method

A roll of a laminate is prepared by applying the adhesive composition to be tested to a first substrate, contacting the exposed adhesive composition with a second substrate, and laminating the first substrate to the second substrate through the adhesive composition with pressure. For accurate and reproducible results, the dew point during preparation of the laminate should be from 5° C. to 15° C. At least one of the two substrates is a low density polyethylene sealant film having a thickness of from about 25 microns to about 38 microns. The coat weight of the adhesive is from about 1.6 grams/square meter ($g/m^2$) to about 1.9 $g/m^2$. The laminate is allowed to cure at a temperature of 23° C.±2° C. and a relative humidity of 50%±5%.

Control Laminate Preparation Method

Control Adhesive Composition

The Control Adhesive Composition is a two-part polyurethane adhesive composition that includes a Part A polyol and a Part B prepolymer is used as a control adhesive. The Part B prepolymer is the reaction product of diphenylmethane diisocyanate (MDI), which contains approximately equal amounts of 4,4'-MDI and 2,4'-MDI and from about 1.8% to about 2.5% 2,2'-MDI, and a diethyleneglycol adipate polyester having a hydroxyl number of 210±10. The final percent isocyanate in the prepolymer is about 18%±0.5%. The Part A polyol is WD4132, which is a polyol having a hydroxyl number of 200±10 that is commercially available from H.B. Fuller Company (St. Paul, Minn.). The prepolymer and polyol are mixed at a weight ratio of about 1.2:1.0 to prepare the control adhesive.

The control laminate is prepared according to the Laminate Preparation Method with the exception that the adhesive composition is the control adhesive composition, one substrate is a sealant film that is a low density polyethylene having a film thickness of from about 25 microns to about 38 microns, and the other substrate is a polyester or polyamide film that has a film thickness of about 12 microns. The control laminate is subjected to the PAA Extraction Test Procedure at the same time and under the same test conditions as the sample laminate(s) being tested.

EXAMPLES

Unsaturated Fatty Acid Esterified Polyol

The following unsaturated fatty acid esterified polyol was used for making the adhesives tested in the Examples:

Esterified Polyol 1 (EP-1)

Unsaturated fatty acid esterified polyol 1 (EP-1) based on soybean oil was prepared by reacting 173 grams of soybean oil with 27 grams of pentaerythritol at 240° C. for 4 hours in the presence of 0.2 grams (0.1%) potassium hydroxide (KOH) as a catalyst. A reflux condenser was utilized to maintain a steady state concentration during the reaction.

Phosphoric acid (85%, technical grade) was added to neutralize the catalyst prior to discharging the batch. The polyol had an average hydroxyl number (OH) of approximately 201, and a functionality of approximately 2.

Example 1

A one-component, solvent-free adhesive composition including a polyurethane prepolymer A was prepared by reacting 25.16 grams of EP-1 esterified polyol, 41.00 grams of a polypropylene glycol having a Mn of 1000 g/mol and a OH number of 112, and 33.74 grams of LUPRINATE M pure 4,4'-MDI at NCO/OH ratio of 1.55:1 at 75° C. for 2 hours. The final percent isocyanate of the prepolymer was 3.97% and the viscosity of the adhesive composition was 8,600 cps at 60° C.

Example 2

A one-component, solvent-free adhesive composition including a polyurethane prepolymer B was prepared by reacting 29.21 grams of EP-1 esterified polyol, 41.00 grams of a polypropylene glycol having an Mn of 1000 g/mol and an OH number of 112, and 29.69 grams of LUPRINATE M pure 4,4'-MDI at NCO/OH ratio of 1.25:1 at 75° C. for 2 hours. The final measured percent isocyanate of the prepolymer was 1.90%, and the viscosity of the adhesive composition was 96,200 cps at 60° C.

Example 3

A one-component, solvent-based adhesive composition including a polyurethane prepolymer C was prepared by reacting 25.16 grams of the EP-1 esterified polyol, 41.00 grams of a polypropylene glycol having an Mn of 1000 g/mol and an OH number of 112, and 33.74 grams of LUPRINATE M pure 4,4'-MDI at NCO/OH ratio of 1.55:1 at 75° C. for 2 hours in the presence of 50.00 grams of ethyl acetate. The final measured percent isocyanate of the prepolymer was 3.84%. Prior to discharging the batch, an additional portion of ethyl acetate was added to achieve a final % solids of from 40% to 50%. At 50% solids, the Zahn cup (EZ-2) viscosity of the adhesive was 21 seconds.

Example 4

A one-component, solvent-based adhesive composition including a polyurethane prepolymer D was prepared by reacting 29.21 grams of EP-1 esterified polyol, 41.00 grams of a polypropylene glycol having an Mn of 1000 g/mol and an OH number of 112, and 29.69 grams of LUPRINATE M pure 4,4'-MDI at NCO/OH ratio of 1.25:1 at 75° C. for 2 hours in the presence of 50.00 grams of ethyl acetate. The final measured percent isocyanate of the prepolymer was 1.90%. Prior to discharging the batch, an additional portion of ethyl acetate was added to achieve a final % solids of between 40% and 50%. At 50% solids, the Zahn cup (EZ-2) viscosity of the adhesive was measured at 24 seconds.

Example 5 (Comparative)

A one-component, solvent-free adhesive composition including a polyurethane prepolymer E was prepared by reacting 25.20 grams of diethylene glycol adipate (DEG-AA) having a Mn of 500 g/mol and an OH number of 210, 41.00 grams of polypropylene glycol having an Mn of 1000 g/mol and an OH number of 112, and 33.70 grams of LUPRINATE M pure 4,4'-MDI at NCO/OH ratio of 1.55:1 at 75° C. for 2 hours. The final measured percent isocyanate of the prepolymer was 4.72%, and the viscosity of the adhesive was 8,000 cps at 60° C.

Example 6

Laminates were prepared by applying the adhesive composition identified in Table 1 at a coat weight of from about 1.2 g/m² to about 4 g/m², or about 1.2 g/m² to about 2 g/m² to a major surface of a first film substrate identified in Table 1 at an application temperature of between 40° C. and 60° C. for solvent-free adhesive compositions and a temperature of 25° C. for solvent-based composition using a roll-to-roll coater or a gravure cylinder coater. The adhesive-coated film was then laminated to a second film substrate identified in Table 1. The peel strength of each laminate was measured according to the T-Peel Adhesion test method within 24 hours of lamination. The test results are set forth in Table 1 in units of g/25 mm.

TABLE 1

| Example Adhesive | % solids | First Substrate | Second Substrate | 1 hour bond | 4 hour bond | 24 hour bond |
| --- | --- | --- | --- | --- | --- | --- |
| 1 | 100 | PET | PE | 76.4 | 148.2 | Destruct |
| 2 | 100 | PET | PE | 120.1 | 574.0 | Destruct |
| 3 | 50 | PET | PE | 33 | 58 | Destruct |
| 4 | 40 | PET | PE | 301 | Destruct* | Destruct |
| Comparative Example 5 | 100 | PET | PE | 8.9 | 7.6 | Destruct |

*substrate(s) tore before the adhesive bond failed.
PET: polyethylene terephthalate
PE: polyethylene Table 1 shows that the adhesives of the invention exhibited very good adhesion build-up (i.e., rapid increase in bond strength) relative to a comparative adhesive.

Example 7

Laminates prepared from various substrates at coat weights of from about 1.6 g/m² to about 2.1 g/m² were prepared using the adhesive compositions and substrates set forth in Table 2. The laminates were tested at 1 hour, 4 hours and 24 hours according to the T-Peel Adhesion Test Method at a peel rate of about 300 mm/min. The results are reported in Table 2 in units of g/25 mm.

TABLE 2

| Example Adhesive | First Substrate | Second Substrate | 1 hour bond | 4 hour bond | 24 hour bond |
| --- | --- | --- | --- | --- | --- |
| 1 | PET | LDPE | 76.4 | 148.2 | Destruct |
| 1 | OPP | OPP | 135.7 | 162.44 | Destruct |
| 1 | Al Foil | LDPE | 306.6 | 411.76 | 621.1 |

PET: polyethylene terephthalate
LDPE: low density polyethylene
OPP: oriented-polypropylene Table 2 shows that the adhesives of the invention exhibited very good adhesion to a variety of substrates.

Example 8

Three laminates were prepared. Each laminate was made from a 12 micron polyethylene terephthalate (PET) film, a 25 micron low density polyethylene (LDPE) film, and the adhesive compositions identified in Table 3. The adhesive composition was applied to the PET substrate at a coat weight of about 1.6 g/m². The dew point at the time of lamination was 10° C. The PAA Food Migration Values of the laminates were determined according to the PAA Extraction Test method and the results are set forth in Table 3 in units of ppb and % Control.

TABLE 3

PAA Food Migration Values (ppb) and Percentage of the Control

|  | 1 Day | | 2 Day | |
|---|---|---|---|---|
|  | ppb | % Control | ppb | % Control |
| Control Adhesive | 43 | 100 | 25 | 100 |
| Ex. 1 | * | * | * | * |
| Ex. 4 | * | * | * | * |

* = An Extractable PAA level was not detectable by HPLC because to the extent that any extractable PAA was present the extractable PAA level was below the detection limit of the HPLC instrument.

Table 3 shows that the adhesives of the invention exhibited very low PAA Food Migration Values compared to that of the Control adhesive when tested at day 1 and day 2 from the day of lamination.

The above specification, examples and data provide a complete description of the disclosure. Since many embodiments can be made without departing from the spirit and scope of the disclosure, the invention resides in the claims hereinafter appended.

All documents referred to herein are incorporated herein to the extent they do not conflict.

We claim:

1. A one-part, atmospheric curing, polyurethane adhesive composition comprising:
   a polyurethane prepolymer comprising
      a reaction product of a polyol component and an isocyanate component, the polyol component comprising an unsaturated fatty acid esterified polyol comprising a reaction product of a first polyol and an ethylenically unsaturated component selected from the group consisting of ethylenically unsaturated oil, an ethylenically unsaturated fatty acid, and combinations thereof,
      the first polyol comprising at least three hydroxyl groups, and
      a % NCO of from at least 4% by weight to no greater than 7% by weight based on the weight of the prepolymer,
   the adhesive composition exhibiting
      a viscosity of no greater than 15,000 centipoise (cP) at 60° C., and
      a T-Peel value of greater than 40 grams per 25 millimeter (g/25 mm) within no greater than 4 hours when tested according to T-Peel Adhesion Test Method II.

2. The one-part adhesive composition of claim 1, wherein the adhesive composition exhibits a viscosity of no greater than 11,000 centipoise (cP) at 60° C.

3. The one-part adhesive composition of claim 1, wherein the adhesive composition exhibits a PAA Food Migration Value of no greater than 10 microgram/kilogram within 3 days.

4. The one-part adhesive composition of claim 1, wherein the adhesive composition exhibits a T-Peel value of greater than 250 g/25 mm in less than 6 hours when tested according to T-Peel Adhesion Test Method II.

5. The one-part adhesive composition of claim 1, wherein the adhesive composition further comprises a second polyol comprising a polyether polyol.

6. The one-part adhesive composition of claim 1, wherein the prepolymer comprises from at least 4% by weight NCO to no greater than 6% by weight NCO based on the weight of the prepolymer.

7. The one-part adhesive composition of claim 1, wherein the adhesive composition exhibits a PAA Food Migration Value that is less than 35% of the Control within 3 days.

8. A laminate comprising
   a first substrate,
   a second substrate comprising a sealant film, and
   a cured adhesive composition derived from the adhesive composition of claim 1,
   the first substrate being bonded to the second substrate through the cured adhesive composition.

9. The laminate of claim 8, wherein the first and the second substrates are flexible substrates comprising a polymer film selected from the group consisting of a metallized polymer film, polyethylene terephthalate, polypropylene, polyethylene, metallized polypropylene, metalized polyethylene terephthalate, polyamide, metal foil, paper, polylactic, and combinations thereof.

10. The laminate of claim 8, wherein the laminate exhibits a PAA Food Migration Value of no greater than 10 micrograms/kilogram within 3 days.

11. A food package comprising:
   a food product; and
   the laminate of claim 8 at least partially surrounding the product.

12. The one-part, atmospheric curing, polyurethane adhesive composition claim 1, wherein the unsaturated fatty acid esterified polyol has an average hydroxyl functionality of from 1.5 to 2.5.

13. The one-part, atmospheric curing, polyurethane adhesive composition claim 1, wherein the unsaturated fatty acid esterified polyol is a reaction product of trimethylol propane and soybean oil.

14. The one-part, atmospheric curing, polyurethane adhesive composition claim 1, wherein the ethylenically unsaturated oil comprises a vegetable oil selected from the group consisting of soybean oil, linseed oil, tung oil, sunflower oil, safflower oil, tall oil, olive oil, cottonseed oil, and combinations thereof, and the ethylenically unsaturated fatty acid is selected from the group consisting of oleic acid, linoleic acid, linolenic acid, eicosadienoic acid, arachidonic acid, and combinations thereof.

15. The one-part, atmospheric curing, polyurethane adhesive composition claim 1, wherein the first polyol is selected from the group consisting of trimethylol propane, ditrimethylol propane, glycerol, pentaerythritol, dipentaerythritol, trimethylolethane, xylitol, sorbitol, mannitol, sucrose, castor oil, and combinations thereof.

16. A laminate comprising:
   a first substrate;
   a cured adhesive composition derived from a polyurethane prepolymer that is a reaction product of a polyol component and an isocyanate component, the polyol component comprising an unsaturated fatty acid esterified polyol that is a reaction product of a first polyol and at least one of an ethylenically unsaturated oil and an ethylenically unsaturated fatty acid, the first polyol being selected from the group consisting of trimethylol propane, ditrimethylol propane, glycerol, pentaerythritol, dipentaerythritol, trimethylolethane, xylitol, sorbitol, mannitol, sucrose, castor oil, and combinations thereof; and a second substrate bonded to the first substrate through the cured adhesive composition, the laminate exhibiting at least one of a PAA Food Migration Value of no greater than 10 micrograms/kilogram within 2 days, and a T-Peel value of at least 40 g/25 mm within no greater than 4 hours when tested according to T-Peel Adhesion Test Method I.

17. The laminate of claim 16, wherein the ethylenically unsaturated oil comprises a vegetable oil comprising soybean oil, linseed oil, tung oil, sunflower oil, safflower oil, tall oil, olive oil, cottonseed oil, or a combination thereof, and the ethylenically unsaturated fatty acid comprises oleic acid, linoleic acid, linolenic acid, eicosadienoic acid, arachidonic acid, or a combination thereof.

18. The laminate of claim 16, wherein the first polyol is selected from the group consisting of trimethylol propane, ditrimethylol propane, glycerol, pentaerythritol, dipentaerythritol, trimethylolethane, xylitol, sorbitol, mannitol, sucrose, castor oil, and combinations thereof.

19. A one-part, atmospheric curing, polyurethane adhesive composition comprising:

a polyurethane prepolymer comprising a reaction product of a polyol component and an isocyanate component, the polyol component comprising an unsaturated fatty acid esterified polyol comprising a reaction product of a first polyol and at least one of an ethylenically unsaturated oil and an ethylenically unsaturated fatty acid, the first polyol comprising at least three hydroxyl groups and being selected from the group consisting of trimethylol propane, ditrimethylol propane, glycerol, pentaerythritol, dipentaerythritol, trimethylolethane, xylitol, sorbitol, mannitol, sucrose, castor oil, and combinations thereof, the ethylenically unsaturated oil being selected from the group consisting of soybean oil, linseed oil, tung oil, sunflower oil, safflower oil, tall oil, olive oil, cottonseed oil, and combinations thereof, and the ethylenically unsaturated fatty acid being selected from the group consisting of oleic acid, linoleic acid, linolenic acid, eicosadienoic acid, arachidonic acid, and combinations thereof, and a % NCO of from at least 4% by weight to no greater than 7% by weight based on the weight of the prepolymer, the adhesive composition exhibiting a viscosity of no greater than 15,000 centipoise (cP) at 60° C., and a T-Peel value of greater than 40 grams per 25 millimeter (g/25 mm) within no greater than 4 hours when tested according to T-Peel Adhesion Test Method II.

20. A method of making the laminate of claim 16, the method comprising:

applying a one-part, atmospheric curable adhesive composition to the first substrate, and contacting the adhesive composition with the second substrate to form the laminate, the laminate further exhibiting a PAA Food Migration Value that is less than 35% of the Control within 3 days.

21. The method of claim 20, wherein the laminate further exhibits a T-Peel value of greater than 250 g/25 mm in less than 6 hours when tested according to T-Peel Adhesion Test Method I.

22. The method of claim 20, wherein the first and the second substrates are flexible substrates comprising a polymer film selected from the group consisting of a metallized polymer film, polyethylene terephthalate, polypropylene, polyethylene, metallized polypropylene, metalized polyethylene terephthalate, polyamide, metal foil, paper, polylactic, and combinations thereof.

* * * * *